(12) United States Patent
Mabuchi (10) Patent No.: US 6,891,907 B1
(45) Date of Patent: May 10, 2005

(54) FREQUENCY OFFSET CORRECTION SYSTEM AND CORRECTION METHOD

(75) Inventor: Tetsuo Mabuchi, Tokyo (JP)

(73) Assignee: NEC Corporation (JP)

( * ) Notice: Subject to any disclaimer, the term of this patent is extended or adjusted under 35 U.S.C. 154(b) by 926 days.

(21) Appl. No.: 09/704,646

(22) Filed: Nov. 2, 2000

(30) Foreign Application Priority Data

Nov. 5, 1999 (JP) .......................................... 11-314585

(51) Int. Cl.[7] .......................................... H04L 27/06
(52) U.S. Cl. ...................... 375/344; 375/262; 375/326; 375/343; 375/327; 375/329
(58) Field of Search ............................... 375/327, 329, 375/365, 150, 346; 455/65

(56) References Cited

U.S. PATENT DOCUMENTS

| 4,621,365 | A | * | 11/1986 | Chiu | 375/149 |
| 5,361,276 | A | * | 11/1994 | Subramanian | 375/150 |
| 5,659,573 | A | * | 8/1997 | Bruckert et al. | 375/142 |
| 5,818,882 | A | * | 10/1998 | Komatsu | 375/344 |
| 6,104,237 | A | * | 8/2000 | Mabuchi | 329/307 |
| 6,522,696 | B1 | * | 2/2003 | Mobin et al. | 375/262 |

FOREIGN PATENT DOCUMENTS

| JP | 06030070 | 2/1994 | .................... 27/38 |

* cited by examiner

*Primary Examiner*—Stephen Chin
*Assistant Examiner*—Sudhanshu C. Pathak
(74) *Attorney, Agent, or Firm*—Dickstein, Shapiro, Morin & Oshinsky, LLP.

(57) ABSTRACT

A frequency offset correction system includes a phase shift estimation unit and correction unit. The phase shift estimation unit estimates a pilot phase shift from pilot signal data for a plurality of bits, and estimates a data phase shift of data from the pilot phase shift for each bit when the frequency offset of a received signal having data of an in-phase component whose bit rate is variable, and pilot signal data of a quadrature component is small. The correction unit sequentially adds data phase shifts and pilot phase shifts estimated by the phase shift estimation unit, and performs frequency offset correction of the received signal using a phase shift obtained by selectively inserting the estimated pilot phase shifts in the added estimated data phase shifts. A frequency offset correction method is also disclosed.

9 Claims, 6 Drawing Sheets

FREQUENCY OFFSET CORRECTION SYSTEM AND CORRECTION METHOD

BACKGROUND OF THE INVENTION

The present invention relates to an AFC (Auto Frequency Control) circuit and, more particularly, to a frequency offset correction system and correction method used in the AFC circuit of a CDMA (Code Division Multiple Access) receiver.

Figure 5:
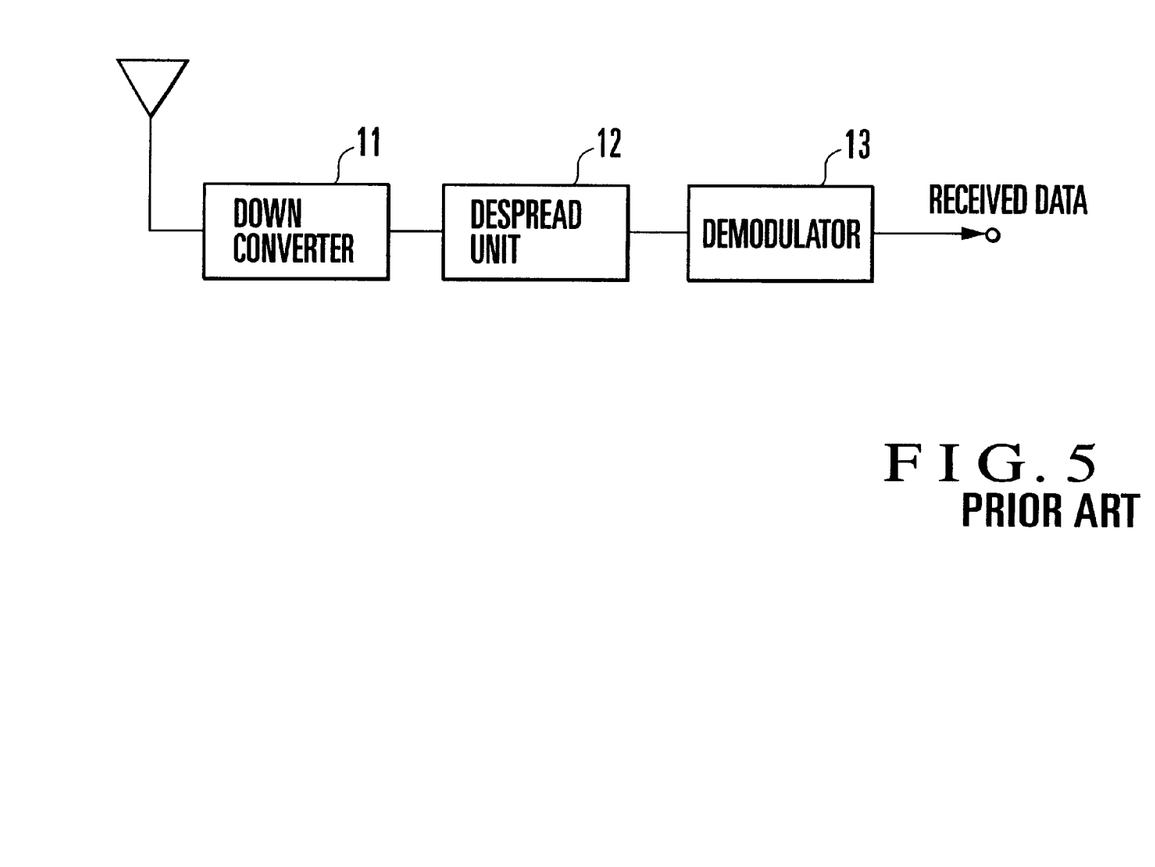
FIG. 5 is a block diagram showing the schematic arrangement of a conventional CDMA receiver.

As shown in FIG. 5, a conventional CDMA receiver comprises a down converter 11 for receiving an RF (Radio Frequency) signal and converting it into an IF (Intermediate Frequency) signal, a despread unit 12 for spectrum-despreading the IF signal output from the down converter 11, and a demodulator 13 for demodulating an output signal from the despread unit 12 to generate received data.

A CDMA received signal is a signal prepared by modulating a signal into BPSK (Binary Phase Shift Keying) signals by data and pilot signal data of I-Channel (In-phase component) and Q-Channel (Quadrature component), superimposing these signals to modulate them into QPSK (Quadrature Phase Shift Keying) signals, and modulating the resultant signals by a spread code.

Figure 6A:
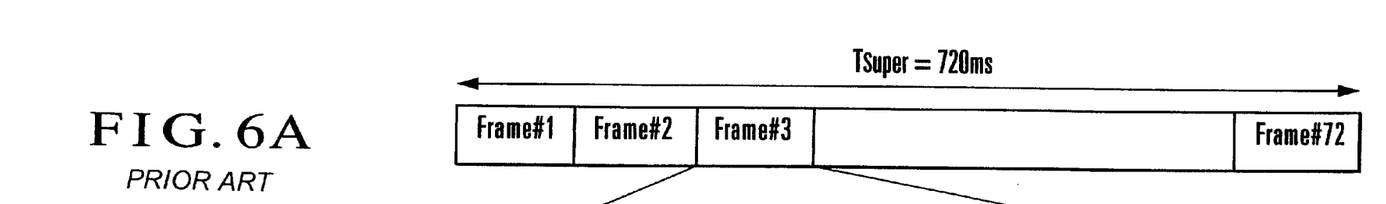
FIGS. 6A to 6D are views showing the frame structure of CDMA received data.
Figure 6B:
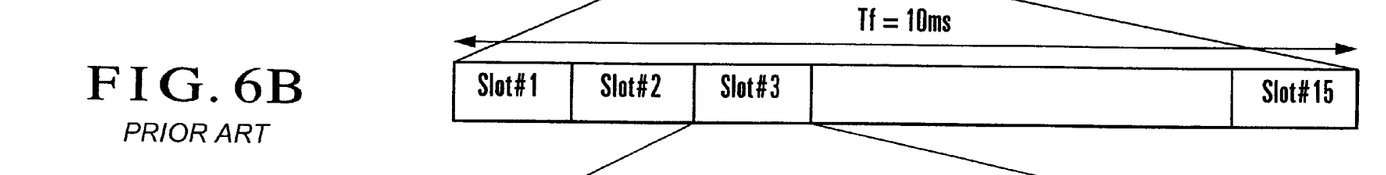

FIGS. 6A to 6D show the frame structure of CDMA received data. As shown in FIG. 6A, one frame of CDMA received data is constituted by Frame#1, Frame#2, Frame #3, . . . , Frame#72, and has one period $T_{Super}$=720 ms. As shown in FIG. 6B, Frame#3 is comprised of Slot#1, Slot #2, Slot#3, . . . , Slot#15, and has one period Tf=10 ms.

Figure 6C:
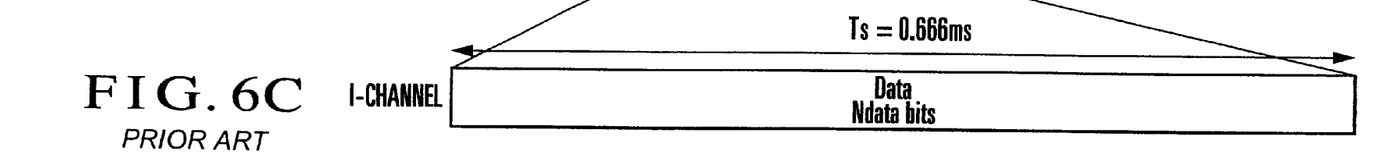
Figure 6D:
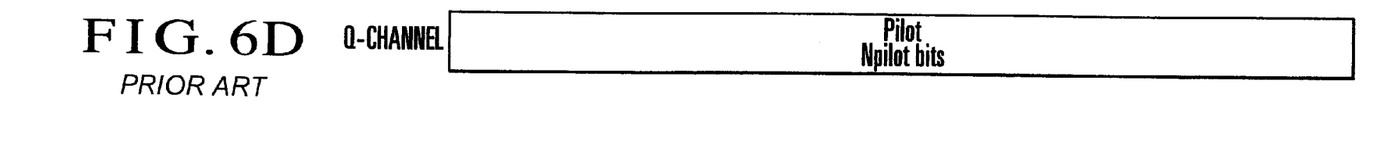

As shown in FIGS. 6C and 6D, Slot#3 is made up of I-channel and Q-Channel, and has one period Ts=0.666 ms. I-Channel has $N_{data}$-bit data, and Q-Channel has $N_{pilot}$-bit pilot signal data.

Table 1 shows the relationship between the bit rates and the number of bits of I-Channel and Q-Channel in FIGS. 6C and 6D.

TABLE 1

| I-Channel | | Q-Channel | | |
|---|---|---|---|---|
| Channel Bit Rate (kbps) | $N_{data}$ (bits) | Channel Bit Rate (kbps) | $N_{pilot}$ (bits) | n/m = $N_{data}/N_{pilot}$ |
| 15 | 10 | 15 | 10 | 1 |
| 30 | 20 | 15 | 10 | 2 |
| 60 | 40 | 15 | 10 | 4 |
| 120 | 80 | 15 | 10 | 8 |
| 240 | 160 | 15 | 10 | 16 |
| 480 | 320 | 15 | 10 | 32 |
| 960 | 640 | 15 | 10 | 64 |

As shown in Table 1, the channel bit rate of Q-Channel is fixed to, e.g., 15 kbps, and the number ($N_{pilot}$) of bits of pilot signal data is also fixed to, e.g., 10. To the contrary, the channel bit rate of I-Channel is variable, and takes, e.g., 15, 30, 60, 120, 240, 480, and 960 kbps. In correspondence with them, the number ($N_{data}$) of bits of data is also variable, and takes, e.g., 10, 20, 40, 80, 160, 320, and 640.

The AFC circuit of a COMA demodulator comprises a frequency offset correction apparatus for correcting the frequency offset of a received signal. The frequency offset correction apparatus stores pilot signal data (fixed bit rate) of Q-Channel and data (variable bit rate) of I-Channel for one slot. The AFC circuit estimates the frequency offset value from the stored pilot signal data of Q-Channel, and corrects the frequency offset of the received signal at the bit rate of the pilot signal data.

Frequency offset correction of removing a frequency offset from a received signal and performing modulation and the like is used not only in the CDMA but also in another system, as disclosed in Japanese Patent Laid-Open No. 6-30070. To increase the precision of frequency offset correction for a received signal, there is proposed a method of correcting the frequency offset at the bit rate of data of I-Channel using the frequency offset value of estimated pilot signal data.

In the conventional frequency offset correction method, when the channel bit rate of data of I-Channel is higher than that of pilot signal data of Q-Channel, e.g., the truncation error of the frequency offset in obtaining a phase shift $\Delta\theta$ per bit increases.

This will be described in detail. To perform integrating operation for a frequency offset estimated from pilot signal data, phase shifts $\Delta\theta$ are added within one slot. As the channel bit rate of data of I-Channel is higher, the number of channel bits is larger. Thus, the number of phase shifts $\Delta\theta$ added within one slot increases, and the influence of the error of the frequency offset caused by integrating operation increases.

In the conventional frequency offset correction method, when the frequency offset of pilot signal data decreases, the change amount of the phase shift per symbol decreases. Particularly when the angular frequency of pilot signal data of Q-Channel is processed at a fixed point, the truncation error of the frequency offset further increases.

SUMMARY OF THE INVENTION

It is an object of the present invention to provide a frequency offset correction system and method for increasing the precision of frequency offset correction.

To achieve the above object, according to the present invention, there is provided a frequency offset correction system comprising phase shift estimation means for estimating a pilot phase shift from pilot signal data for a plurality of bits, and estimating a data phase shift of data from the pilot phase shift for each bit when a frequency offset of a received signal having data of an in-phase component whose bit rate is variable, and pilot signal data of a quadrature component is small, and correction means for sequentially adding data phase shifts and pilot phase shifts estimated by the phase shift estimation means, and performing frequency offset correction of the received signal using a phase shift obtained by selectively inserting the pilot phase shifts in the added data phase shifts.

DESCRIPTION OF THE PREFERRED EMBODIMENT

The present invention will be described in detail below with reference to the accompanying drawings.

Figure 1:
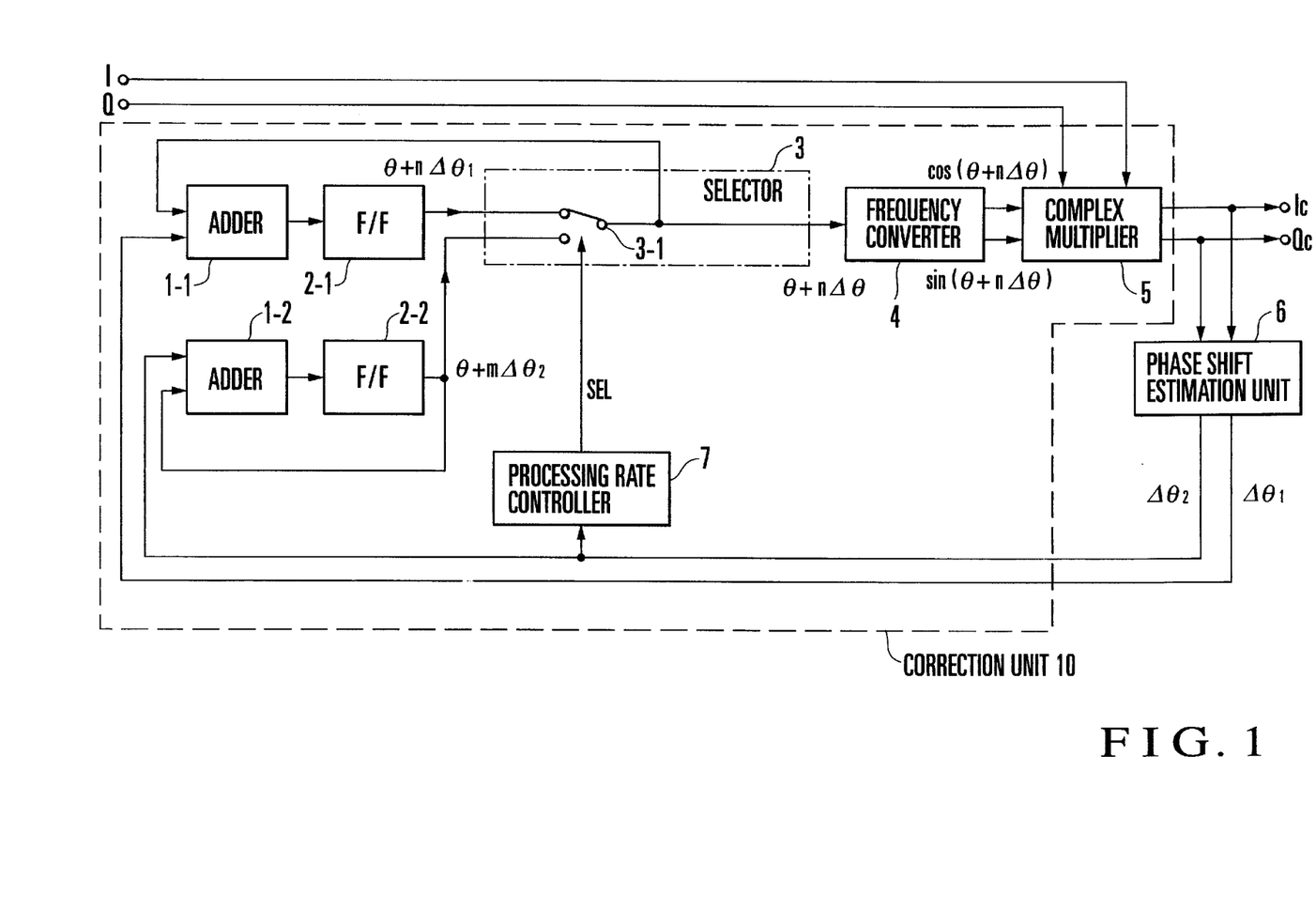
FIG. 1 is a block diagram showing a frequency offset correction apparatus according to an embodiment of the present invention.

FIG. 1 shows a frequency offset correction apparatus according to an embodiment of the present invention. As shown in FIG. 1, the frequency offset correction apparatus of this embodiment comprises adders 1-1 and 1-2. The adder 1-1 receives a phase shift (phase change amount) $\Delta\theta_1$ of data of I-Channel (in-phase component), and adds phase shifts in units of bits. The adder 1-2 receives a phase shift (phase change amount) $\Delta\theta_2$ Of pilot signal data of Q-Channel (quadrature component), and adds phase shifts in units of bits.

The output ports of the adders 1-1 and 1-2 are respectively connected to flip-flops (F/Fs) 2-1 and 2-2. The output port of the flip-flop 2-2 is connected to one input port of the adder 1-2. The output port of the flip-flop 2-1 is connected to a selector 3 for selecting one of the outputs of the flip-flops 2-1 and 2-2. The output port of a switch 3-1 is connected to one input port of the adder 1-1.

The output port of the switch 3-1 is connected to a complex multiplier 5 via a frequency converter 4. The output port of the complex multiplier 5 is connected to a phase shift estimation unit 6 for estimating the phase shifts $\Delta\theta_1$ and $\Delta\theta_2$ per bit. One output port of the phase shift estimation unit 6 is connected to the other input port of the adder 1-1, whereas the other output port is connected the other input port of the adder 1-2.

The phase shifts $\Delta\theta_1$ and $\Delta\theta_2$ correspond to frequency offsets $\Delta f(=\Delta\theta/2\pi T)$ per bit of data of I-Channel and pilot signal data of Q-Channel. T is a time per bit (1/bit rate), and $\Delta f$ is a frequency offset per bit.

The other output port of the phase shift estimation unit 6 is connected to a processing rate controller 7. The processing rate controller 7 receives update information of the phase shift $\Delta\theta_1$ by the phase shift $\Delta\theta_2$ on the basis of the relationship in magnitude between the bit rate and frequency offset of data of I-Channel obtained from the phase shift estimation unit 6, and performs switching control of the switch 3-1 of the selector 3.

The adder 1-1 and flip-flop 2-1 add a previous phase shift $\theta+(n-1)\Delta\theta_1$ to the phase shift $\Delta\theta_1$ per bit, and execute integrating operation at a timing corresponding to the channel bit rate. The adder 1-2 and flip-flop 2-2 add a previous phase shift $\theta+(m-1)\Delta\theta_2$ to the phase shift $\Delta\theta_2$ per bit, and execute integrating operation at a timing corresponding to the channel bit rate.

The switch 3-1 of the selector 3 alternatively selects one of output signals from the flip-flops 2-1 and 2-2, i.e., integrated signals $\theta+n\Delta\theta_1$ and $\theta+m\Delta\theta_2$ in accordance with a selection signal (SEL) from the processing rate controller 7, and outputs the selected signal as a selector output $\theta+n\Delta\theta$ to the frequency converter 4. Note that a selector output $\theta+m\Delta\theta_2$ is input as a previous sum to the adder 1-1.

The frequency converter 4 performs frequency conversion for the selector output $\theta+n\Delta\theta$, and outputs an in-phase component $\cos(\theta+n\Delta\theta)$ and quadrature component $\sin(\theta+n\Delta\theta)$ to the complex multiplier 5. The complex multiplier 5 executes complex multiplication of the output signal $\cos(\theta+n\Delta\theta)$ and $\sin(\theta+n\Delta\theta)$ from the frequency converter 4 by a CDMA received signal (I and Q) to perform frequency offset correction of the received signal (I and Q), and outputs the corrected received signal ($I_c$ and $Q_c$).

Note that the CDMA received signal (I and Q) having a frequency offset is a signal prepared by primary-modulating the BPSK signals of data and pilot signal data of I-Channel and Q-Channel, and further secondary-modulating the QPSK signals by a spread code.

Complex multiplication by the complex multiplier 5 is executed by $$I_c+jQc=(I+jQ)\exp[j(\theta+n\Delta\theta)]$$
$$I_c=I\cos(\theta+n\Delta\theta)-Q\sin(\theta+n\Delta\theta)$$
$$Q_c=I\sin(\theta+n\Delta\theta)+Q\cos(\theta+n\Delta\theta) \quad (1)$$

The phase shift estimation unit 6 performs estimation processing of the phase shifts $\Delta\theta_1$ and $\Delta\theta_2$ per bit as follows. The two phase shifts $\Delta\theta_1$ and $\Delta\theta_2$ per bit estimated from a received signal by the phase shift estimation unit 6 are given by $$\Delta\theta=2\pi\Delta f\cdot T \quad (2)$$

There are various methods of calculating the frequency offset using pilot signal data, and one method will be exemplified. The phase shift $\Delta\theta_2$ corresponding to the frequency offset of the channel bit rate (15 kbps) of pilot signal data is obtained using the pilot signal data.

More specifically, as given by equation (3), an average is calculated for ($N_{pilot}-1$) from a received signal ($I_c$ and $Q_c$) and the theoretical values ($PL_i$ and $PL_q$) of pilot signal data, thereby obtaining a frequency shift vector $\Theta$ per bit of pilot signal data:

$$\Theta=\Sigma(D_k\times U_k^+)(D_{k-1}\times U_{k-1}^+)^+$$
$$D_k=PLi+jPLq$$
$$U_k=I_c+jQ_c \quad (3)$$

where $^+$ is the complex conjugate.

As given by equation (4), $\Delta\theta_2(p)$ corresponding to the frequency offset per bit of pilot signal data can be attained based on the inverse tangent of the in-phase component and quadrature component of the frequency offset vector:

$$\Delta\theta_2(p)=\Delta\theta_2(p-1)+A\ \text{TAN}(Im[\Theta]/Re[\Theta]) \quad (4)$$

where p is an integer.

On the other hand, as given by equation (5), $\Delta\theta_1(P)$ corresponding to the frequency offset per bit of a data signal can be obtained by a right shift of log $2(N_{data}/N_{pilot})$ of $\Delta\theta_2(p)$:

$$\Delta\theta_1(p)=\Delta\theta_2(p)>>\log 2(N_{data}/N_{pilot}) \quad (5)$$

In equation (5), when processing is done at a fixed decimal point under the constraints of the hardware arrangement and the like, $\Delta\theta_1(p)$ truncates lower bits of $\Delta\theta_2(p)$ to decrease the precision. This becomes more prominent at a higher channel bit rate of data of I-Channel. If the frequency offset decreases, the phase change amount per bit (symbol) decreases, and an error increases particularly upon processing at each frequency. For this reason, as the bit rate of data of I-Channel increases, the phase offset $\Delta\theta_1$ is partially switched by the phase shift $\Delta\theta_2$.

To increase the phase change amount as the frequency offset decreases, phase change amounts ($2\Delta\theta_2$, $3\Delta\theta_2$, ...) for a plurality of bits (symbols) are obtained for pilot signal data of Q-Channel. The phase change amount $\Delta\theta_1$ per bit of data of I-Channel is calculated from the phase change amounts for a plurality of bits (symbols) obtained for the pilot signal data of Q-Channel.

The processing rate controller 7 outputs based on the phase shift $\Delta\theta_2$ the selection signal SEL for controlling switching of the switch 3-1 of the selector 3 (to be described later). Letting $\theta$ be the initial phase, the selector 3 selects a signal $\theta+n\Delta\theta_1$ or $\theta+m\Delta\theta_2$ by the selection signal SEL, and outputs $\theta+n\Delta\theta$.

A correction unit 10 is constituted by the adders 1-1 and 1-2, flip-flops 2-1 and 2-2, selector 3, frequency converter 4, complex multiplier 5, and processing rate controller 7.

FIGS. 2A to 2E show the timings of selection control operation of the processing rate controller 7 when the bit rate of data of I-Channel is high. In the following description, $N_{data}/N_{pilot}=4$, the phase shift $\Delta\theta_2$ is selected when a time T is n mod 4=0 (mod is an operator for calculating a remainder), and otherwise, the phase shift $\Delta\theta_1$ is selected.

Figure 2A:
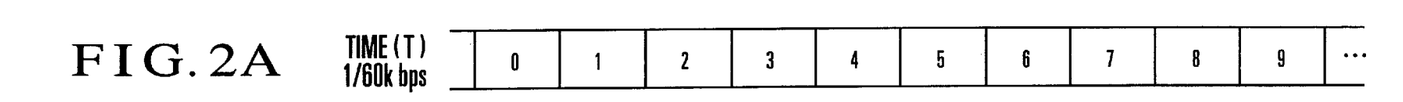
FIGS. 2A to 2E are timing charts showing selection control operation of a processing rate controller 7 shown in FIG. 1 when the bit rate of data of I-Channel is high.
Figure 2B:
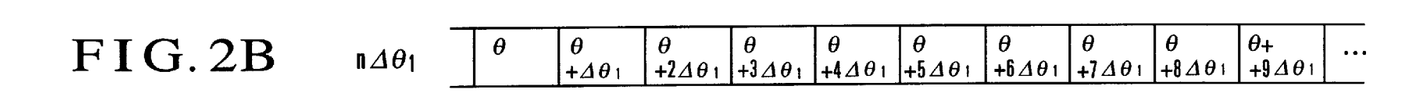
Figure 2C:
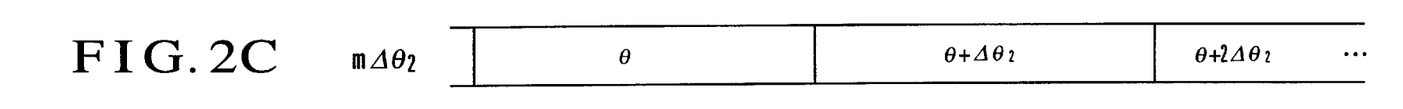

The time (T) shown in FIG. 2A is a time per bit (1/bit rate) when the channel bit rate of I-Channel in Table 1 is 60 kbps. As shown in FIG. 2B, an output n $\Delta\theta_1$ from the flip-flop 2-1 is represented every time T as $\theta$, $\theta+\Delta\theta_1$, $\theta+2\Delta\theta_1$, $\theta+3\Delta\theta_1$, $\theta+4\Delta\theta_1$, $\theta+5\Delta\theta_1$, $\theta+6\Delta\theta_1$, $\theta+7\Delta\theta_1$, $\theta+8\Delta\theta_1$, $\theta+9\Delta74_1$, . . . . As shown in FIG. 2C, an output $m\Delta\theta_2$ from the flip-flop 2-2 is represented every bit of pilot signal data as $\theta$, $\theta+\Delta\theta_2$, $\theta+2\Delta\theta_2$, . . . .

Figure 2D:
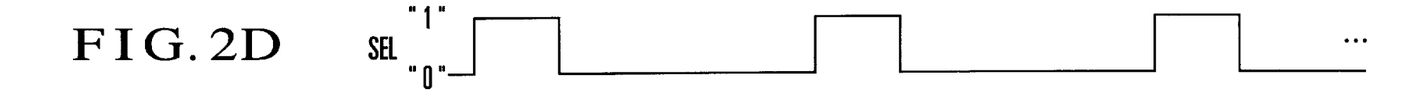
Figure 2E:
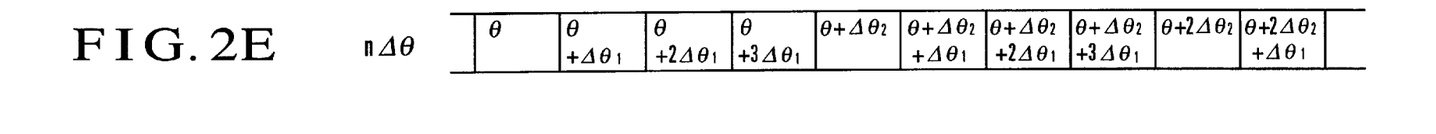

As shown in FIG. 2D, the processing rate controller 7 generates a signal SEL at a Q-Channel bit rate of 15 kbps. The signal SEL selects the output $n\Delta\theta_1$ from the flip-flop 2-1 for "0", and the output $m\Delta\theta_2$ from the flip-flop 2-2 for "1". As shown in FIG. 2E, an output $n\Delta\theta$ from the switch 3-1 of the selector 3 is represented every time T as $\theta$, $\theta+\Delta74_1$, $\theta+2\Delta\theta_1$, $\theta+3\Delta\theta_1$, $\theta+\Delta\theta_2$, $\theta+\Delta\theta_2+\Delta\theta_1$, $\theta+\Delta\theta_2+2\Delta\theta_1$, $\theta+\Delta\theta_2+3\Delta\theta_1$, $\theta+2\Delta\theta_2$, $\theta+2\Delta\theta_2+\Delta\theta_1$, . . . .

Hence, the processing rate controller 7 inserts, every 4 T time, selection of the phase shift of Q-Channel in selection of the phase shift for each bit rate of I-Channel.

Note that the signal SEL is generated at 15 kbps. When the bit rate of data is low, the signal SEL may be generated at 15 kbps or less, and the bit rate of the signal SEL may be increased with an increase in the bit rate of data in order to suppress an increase in error by more frequently correcting the phase shift of pilot signal data as the bit rate of data increases.

Figure 3A:
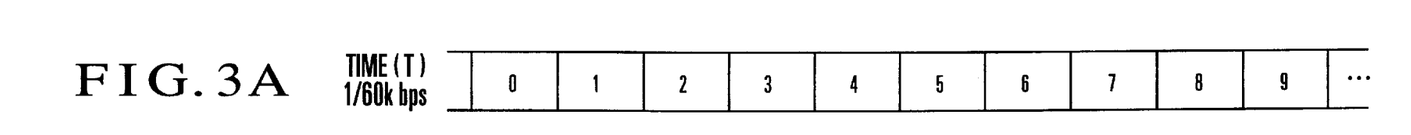
FIGS. 3A to 3E are timing charts showing section control operation of the processing rate controller shown in FIG. 1 when the frequency offset (phase shift $\Delta\theta_2$) of pilot signal data of Q-Channel is small.

FIGS. 3A to 3E show the timings of section control operation of the processing rate controller 7 when the frequency offset (phase shift $\Delta\theta_2$) of pilot signal data of Q-Channel is small. As shown in FIG. 3A, the channel bit rate of I-Channel is 60 kbps, similar to FIG. 2A.

Figures 3B, 3C:
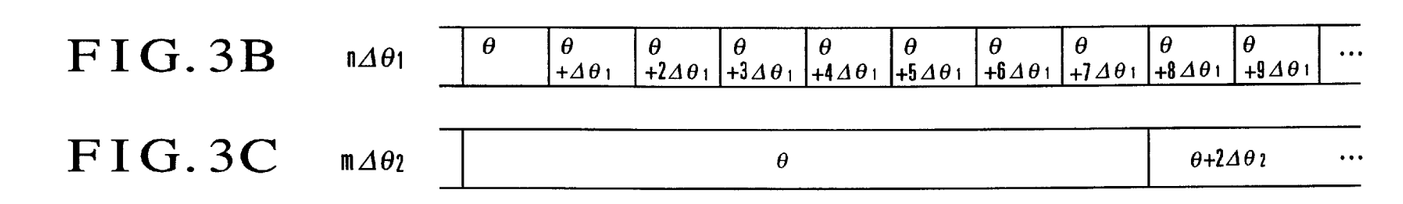
Figures 3D, 3E:
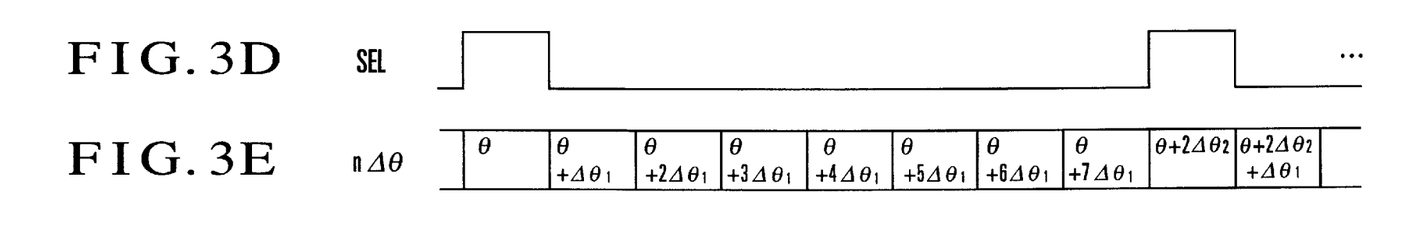

When the frequency offset (phase shift $\Delta\theta_2$) of pilot signal data is small, and the phase shift estimation unit 6 estimates the pilot signal data every 2 bits, the processing rate controller 7 changes the bit rate of Q-Channel to 7.5 kbps, and generates a signal SEL, as shown in FIG. 3D. As shown in FIG. 3B, the output $n\Delta\theta_1$ from the flip-flop 2-1 is represented every time T as $\theta$, $\theta+\Delta\theta_1$, $\theta+2\Delta\theta_1$, $\theta+3\Delta\theta_1$, $\theta+4\Delta\theta_1$, $\theta+5 \Delta\theta_1$, $\theta+6\Delta\theta_1$, $\theta+7\Delta\theta_1$, $\theta+8\Delta\theta_1$, $\theta+9\Delta\theta_1$, . . . .

As shown in FIG. 3C, the output $m\Delta\theta_2$ from the flip-flop 2-2 is represented every 2 bits of pilot signal data as $\theta$, $\theta+2\Delta\theta_2$, . . . . As shown in FIG. 3E, the output $n\Delta\theta$ from the switch 3-1 of the selector 3 is represented every time T as $\theta$, $\theta+\Delta\theta_1$, $\theta+2\Delta\theta_1$, $\theta+3\Delta\theta_1$, $\theta+4\Delta\theta_1$, $\theta+5\Delta\theta_1$, $\theta+6\Delta\theta_1$, $\theta+7\Delta\theta_1$, $\theta+2\Delta\theta_2$, $\theta+2\Delta\theta_2+\Delta\theta_1$, . . . .

The processing rate controller 7 inserts, every 8 T time, selection of $m\Delta\theta_2$ of Q-Channel in selection of the phase shift $n\Delta\theta_1$ for each bit rate of I-Channel.

Figure 4:
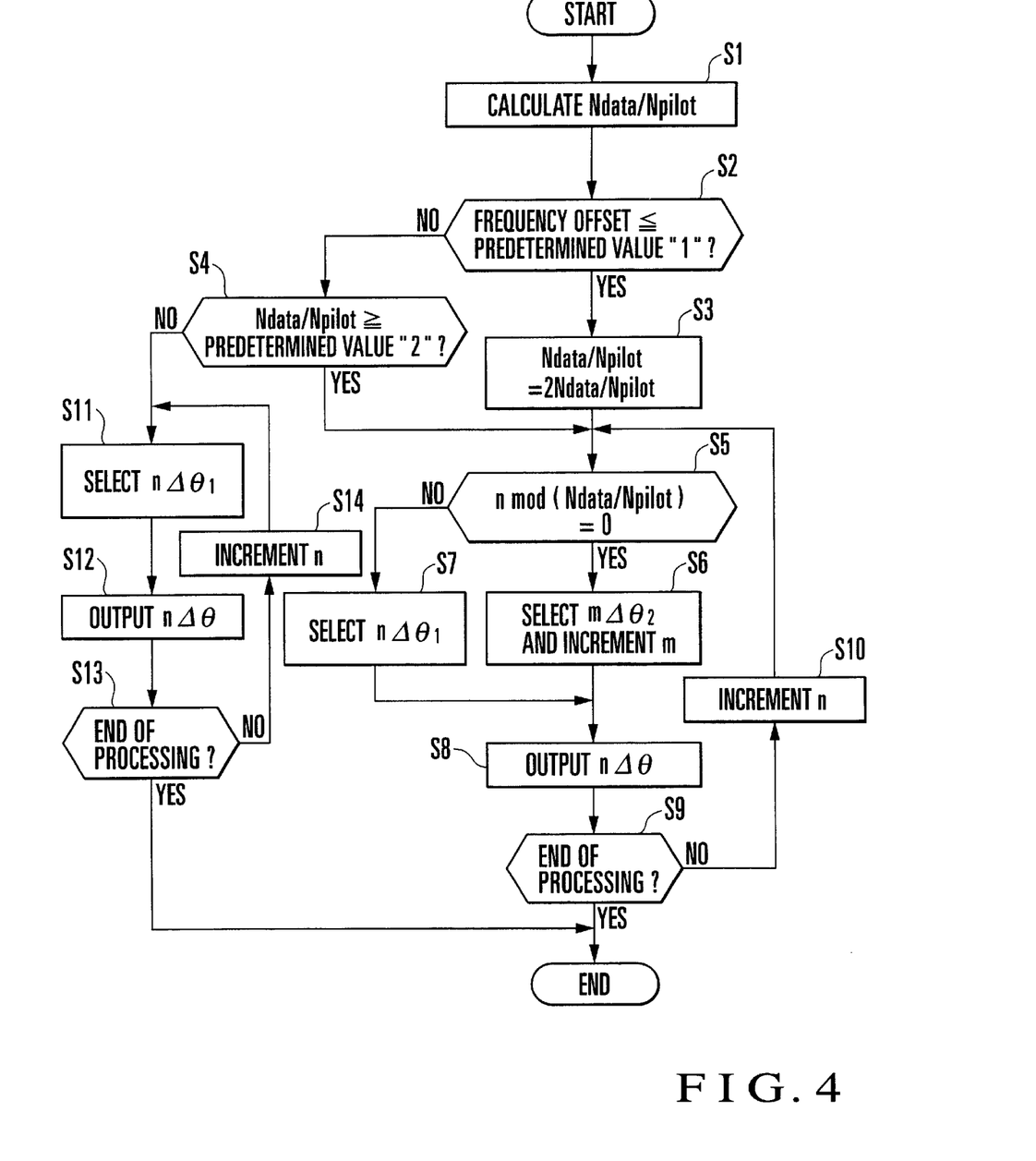
FIG. 4 is a flow chart for explaining selection control operation of the processing rate controller 7 shown in FIG. 1.

Processing operation of the processing rate controller 7 will be explained with reference to FIG. 4. In step S1, the processing rate controller 7 calculates $N_{data}/N_{pilot}$ on the basis of frame data shown in FIGS. 6A to 6D. For example, $N_{data}/N_{pilot}=4$. As shown in Table 1, since the number of bits of pilot signal data of Q-Channel is constant 10, the channel bit rate is fixed to 15 kbps.

To the contrary, the bit rate of data of I-Channel increases to 15, 30, 60, 120, 240, 480, and 960 kbps as the number of bits of data increases to 10, 20, 40, 80, 160, 320, and 640. Thus, a possible value $N_{data}/N_{pilot}$ is $N_{data}/N_{pilot}=1$, 2, 4, 8, 16, 32, and 64.

In step S2, the processing rate controller 7 checks whether the frequency offset (phase shift $\Delta\theta_2$) is smaller than a predetermined value "1". If NO in step S2, the processing rate controller 7 shifts to step S4; and if YES, to step S3. In step S3, the processing rate controller 7 sets $N_{data}/N_{pilot}=2N_{data}/N_{pilot}$ (=8), and then shifts to step S5. Note that $N_{data}/N_{pilot}=2N_{data}/N_{pilot}$ is merely an example, and $N_{data}/N_{pilot}$ is not limited to this and may be increased to $N_{data}/N_{pilot}=3N_{data}/N_{pilot}$, $4N_{data}/N_{pilot}$, . . . as the frequency offset decreases.

In step S4, the processing rate controller 7 checks whether $N_{data}/N_{pilot}$ is larger than a predetermined value "2". If YES in step S4, i.e., the bit rate of data is high, the processing rate controller 7 advances to step S5; and if NO, to step S11. In step S5, the processing rate controller 7 checks whether n mod($N_{data}/N_{pilot}$)=0 is established.

If YES in step S5, the processing rate controller 7 selects in step S6 $m\Delta\theta_2$ shown in FIG. 2C when the frequency offset is large, and $m\Delta\theta_2$ shown in FIG. 3C when the frequency offset is small. If NO in step S5, the processing rate controller 7 selects in step S7 $n\Delta\theta_1$ shown in FIG. 2B when the frequency offset is large, and $n\Delta\theta_1$ shown in FIG. 3B when the frequency offset is small. After the processing rate controller 7 selects $m\Delta\theta_2$, it increments m. After processing in steps S6 and S7, the processing rate controller 7 shifts to step S8.

In step S8, the processing rate controller 7 controls the switch 3-1 of the selector 3 so as to output $n\Delta\theta$ shown in FIG. 2E when the frequency offset is large, and $n\Delta\theta$ shown in FIG. 3E when the frequency offset is small.

In steps S9 and S10, the processing rate controller 7 determines whether to continue processing. If NO in step S9, the processing rate controller 7 increments n.

If YES in step S4, i.e., the frequency offset is large and the bit rate of data is low, the processing rate controller 7 selects $n\Delta\theta_1$ (FIGS. 2B and 3B) in step S11, like the prior art, because of no influence of the truncation error. In steps S12, S13, and S14, the processing rate controller 7 determines whether to continue processing. If NO in step S13, the processing rate controller 7 increments n.

According to the present invention, when the bit rate of data of I-Channel is high, the ratio (frequency) of switching the phase shift of data of I-Channel to the phase shift of pilot signal data of Q-Channel is increased. When the frequency offset is small, the phase shift of data of I-Channel is calculated from a phase shift estimated for each of a plurality of bits of pilot signal data of Q-Channel, and the phase shift of the data is switched to the phase shift of each of a plurality of bits of the pilot signal data.

Selection insertion of the phase shift of pilot signal data decreases the frequency offset value per bit when the channel bit rate of data of I-Channel is high. This can prevent an increase in truncation error. This is because, as the bit rate of data of I-Channel is higher, the number of channel bits is larger, and the number of bits added within one slot increases to prevent an increase in the influence of an error.

At the same time, when the frequency offset with respect to pilot signal data of Q-Channel decreases, the phase change amount per bit (symbol) is changed to the phase change amount of a plurality of bits to increase the phase change amount. This can prevent an increase in error especially when the angular frequency is processed at a fixed decimal point.

Particularly when the bit rate of data is high, and the frequency offset is small, the phase shift estimation unit 6 may estimate the phase shift of pilot signal data for a plurality of bits by giving priority to the case wherein the frequency offset is small. This is because an increase in the error of the phase shift of pilot signal data increases the error of the phase shift of data.

As has been described above, according to the present invention, an error by integrating operation of the frequency offset is decreased when the channel bit rate of data of the in-phase component of a signal is high. Further, the truncation error of the frequency offset is decreased when the frequency offset of pilot signal data of the quadrature component is small. Accordingly, the correction precision of the frequency offset increases.

When the bit rate of data is high, the sum of errors of the data phase shift is corrected by the pilot phase shift, and the phase shift of a pilot data signal at a small frequency offset is estimated in units of a plurality of bits. The truncation error can be decreased, and the correction precision of the frequency offset can be increased.

As the frequency offset decreases, the estimated phase shift of pilot signal data per bit decreases. Not only the truncation error of the estimated phase shift of pilot signal data increases, but also the truncation error of the estimated phase shift of data increases. However, as the frequency offset decreases, the number of bits is increased to increase the estimated phase shift of pilot signal data. Accordingly, the error can be decreased.

As the bit rate of data increases, a larger number of truncation errors of the estimated phase shift of data are added. However, the sum is corrected by the estimated phase shift of pilot signal data, so that the error can be decreased.

In addition, the error is decreased by giving priority not to a case wherein the bit rate of data is high, but to a case wherein the frequency offset is small. This is because, if the error of the phase shift of pilot signal data increases, the error of the phase shift of data also increases.

What is claimed is:

1. A frequency offset correction system comprising:
   phase shift estimation means for estimating a pilot phase shift from pilot signal data for a plurality of bits, and estimating a data phase shift of data from the estimated pilot phase shift for each bit when a frequency offset of a received signal having data of an in-phase component whose bit rate is variable, and pilot signal data of a quadrature component is small; and
   correction means for sequentially adding data phase shifts and pilot phase shifts estimated by said phase shift estimation means, and performing frequency offset correction of the received signal using a phase shift obtained by selectively inserting the estimated pilot phase shifts in the added estimated data phase shifts.

2. A system according to claim 1, wherein said correction means comprises:
   a first adder for sequentially adding data phase shift signals from said phase shift estimation means;
   a second adder for sequentially adding pilot phase shift signals from said phase shift estimation means;
   a selector for selecting either of the data phase shift signals added by said first adder and the pilot phase shift signals added by said second adder, and outputting a phase shift signal used for frequency offset correction; and
   a processing rate controller for controlling said selector to insert the added pilot phase shift signals from said second adder in the added data phase shift signals from said first adder at an estimated timing of said phase shift estimation means.

3. A system according to claim 2, wherein said phase shift estimation means increases a bit rate of the pilot signal data for estimating the pilot phase shift as the frequency offset decreases.

4. A system according to according to claim 2, wherein said processing rate controller increases an inserting frequency of the added estimated pilot phase shift signals in the added data phase shift signals as the bit rate of the data increases.

5. A system according to according to claim 2, further comprising:
   frequency conversion means for converting the phase shift signal from said selector into two frequencies of the in-phase component and quadrature component; and complex multiplication means for executing complex multiplication for the converted frequencies and the received signal to perform frequency offset correction of the received signal, and outputting the received signal having undergone frequency offset correction to said phase shift estimation means.

6. A system according to according to claim 2, wherein said phase shift estimation means and said correction means are used in an AFC (Auto Frequency Control) circuit of a CDMA (Code Division Multiple Access) receiver, and correct the frequency offset.

7. A system according to according to claim 2, wherein the data phase shift signal of the data and the pilot phase shift signal that are selected by said selector are respectively supplied as previous sums to said first and second adders.

8. A frequency offset correction method comprising the steps of:
   estimating a pilot phase shift signal from pilot signal data for each bit, and estimating a data phase shift signal from the estimated pilot phase shift signal for each bit when a frequency offset of a received signal having data of an in-phase component whose bit rate is variable, and pilot signal data of a quadrature component is small;
   sequentially adding the estimated data phase shift signals and the estimated pilot phase shift signals;
   selecting either of the added estimated data phase shift signals and the added estimated pilot phase shift signals, and outputting the selected estimated phase shift signal to be used for frequency offset correction; and
   inserting the estimated pilot phase shift signals in the added estimated data phase shift signals at an estimated timing.

9. A method according to according to claim 8, wherein the method further comprises the steps of:
   converting the estimated phase shift signal selected and output at said selecting step into two frequencies of the in-phase component and quadrature component; and
   executing complex multiplication for the converted frequencies and the received signal to perform frequency offset correction of the received signal,
   wherein the estimating step estimates the data phase shift signal and the pilot phase shift signal using the received signal having undergone frequency offset correction.

* * * * *